Patented Dec. 15, 1953

2,662,835

UNITED STATES PATENT OFFICE 2,662,835

CHROMIUM COORDINATION COMPLEXES OF SATURATED PERFLUORO-MONOCARBOXYLIC ACIDS AND ARTICLES COATED THEREWITH

Thomas S. Reid, New Canada Township, Ramsey County, Minn., assignor to Minnesota Mining & Manufacturing Company, St. Paul, Minn., a corporation of Delaware No Drawing. Application April 6, 1951, Serial No. 219,749

4 Claims. (Cl. 117—121)

This invention relates to my discovery of a new class of fluorocarbon compounds having novel and useful properties.

These new compounds are chromium coordination complexes of the saturated perfluoro-monocarboxylic acids which have from 4 to 10 carbon atoms in the molecule. They are solids which are slightly soluble in water and are highly soluble in acetone and alcohols.

These complexes are quite different from the ordinary chrominum salts of the saturated perfluoro-monocarboxylic acids, $Cr(OOCR_f)_3$. ("$R_f$" represents a fully fluorinated saturated fluorocarbon group). Such salts are insoluble in water to such an extent that they cannot be coated from aqueous solutions in single coating operations to form coatings of appreciable thickness.

The present compounds have particular value as surface treating agents. They can be used to provide extremely thin, tightly bonded, water-repellent films on a variety of surfaces. They can be coated from solutions in water or in organic solvents to form tightly bonded water-insoluble greenish-colored films on glass, and on a wide variety of other materials having hydrophilic surfaces, including metals, cellulosic films, paper, and textile fibers and fabrics. The polycarbon fluorocarbon groups form fluorocarbon "tails" which are located in the outer or exposed surface region of the film and provide what may be termed a "fluorocarbon surface." Saturated fluorocarbons have a high degree of chemical inertness and thermal stability and are water-repellent.

A unique feature of the present chromium complexes is that they can be employed in forming surface treatments or coatings that are not only highly hydrophobic but also possess oleophobic properties.

A complex of the present type can be made by reacting together a saturated perfluoro-monocarboxylic acid ($R_fCOOH$), having from 4 to 10 carbon atoms in the molecule, with chromyl chloride ($CrO_2Cl_2$), in an inert anhydrous solvent vehicle (such as carbon tetrachloride), in the presence of a reducing agent (such as absolute ethanol or the like). An alcohol reducing agent is itself oxidized to form oxygen-containing organic compounds, such as acetic acid, etc. A solution of the chromyl chloride in the solvent is slowly added to a refluxing solution of the fluorocarbon acid and alcohol in the solvent, with constant stirring. The reaction is strongly exothermic and supplies the heat for maintaining the reaction mixture in a refluxing state during the addition of the cromyl chloride. Mixing is continued for at least an hour with sufficient heating to maintain a refluxing state. The resultant green solution is evaporated to constant weight to remove volatiles, resulting in the dried product compound, which is a green solid. Aqueous solutions of these complexes have a lesser degree of acid strength than corresponding solutions of the fluorocarbon acid starting compounds, the latter being relatively strong acids.

It is not feasible to represent the structure of these complexes by formulae. Available analytical procedures do not permit of accurately determining the oxygen content. Because of the complex nature of the reaction product, the use of non-stoichiometric proportions of the starting compounds does not mean that one or the other will necessarily be present in unreacted form in the product. The use of the fluorocarbon acid in higher than a 1 to 2 ratio (relative to the chromyl chloride) will enhance the fluorocarbon characteristic of the surface-treatment coatings formed from the complex. The absence of uncombined fluorocarbon acid in the complex is readily proved by the absence of the characteristic odor of the fluorocarbon acid.

Cyclic as well as non-cyclic fluorocarbon acids can be used. The acids can be represented by the formula $R_fCOOH$, wherein "$R_f$" is a fully fluorinated saturated fluorocarbon group, cyclic or non-cyclic, containing from 3 to 9 carbon atoms, and consisting solely of fluorine and carbon. These are the fully fluorinated (perfluoro) analogues of the saturated monocarboxylic acids of the hydrocarbon system of organic acids, the carbon-bonded hydrogen atoms having been entirely replaced by fluorine atoms. These fluorocarbon acids have distinctive and unique properties and are not mere equivalents of the hydrocarbon acids of conventional organic chemistry. They are much stronger than the latter, resembling the mineral acids in strength. The perfluoroalkyl monocarboxylic acids have the formula: $C_nF_{2n+1}COOH$. The perfluorocarbocyclic monocarboxylic acids have the formula:

$$C_nF_{2n-1}COOH$$

The value of $n$ is 3 to 9 for the acids employed in making the present complexes. The carboxyl group (—COOH) can be linked either to a cyclic carbon atom or to a non-cyclic carbon atom. Examples of the latter are perfluorocyclohexane carboxylic acid ($C_6F_{11}COOH$) and perfluorocyclohexane acetic acid ($C_6F_{11}CF_2COOH$).

A preferred proportion of the starting materials is such as to provide two chromium atoms per acid molecule, such as is obtained by reacting the chromyl chloride and the acid in a 2 to 1 molar ratio. However, this ratio can be varied.

Complexes made from hydrocarbon acids do not form surface films having marked water-repellency unless there are ten or more carbon atoms in the acid molecule and hence it is necessary to use the higher acids (such as stearic acid). Moreover, films formed from such hydrocarbon complexes have oleophilic properties, being wetted by hydrocarbon oils and greases which are adsorbed thereon, in contrast to the oleophobic films formed from the present fluorocarbon complexes.

The above-mentioned complexes made from chromyl chloride initially contain combined chlorine atoms. They can be hydrolyzed and can be ammoniated to form derivative complexes which are also slightly water-soluble and highly soluble in acetone and alcohols, and which polymerize inter se to a highly water-insoluble state. These derivative chromium coordination complexes are a part of the present invention. Chlorine atoms are replaced by hydroxyl groups in the hydrolyzed complex, and by amino groups in the ammoniated complex. These hydrophilic electronegative polar groups are capable of undergoing reactions leading to a polymerized water-insoluble state. The original complex can be hydrolyzed before or after being coated on a surface.

The following coating procedures illustrate suitable techniques:

(1) A solution of the original chlorine-containing complex in a non-aqueous solvent, such as acetone or isopropanol, is coated on the material to be treated. The coated complex will react with adsorbed surface moisture if present, and in any case can be treated with applied moisture, to hydrolyze the complex. Subsequent heating in an oven will eliminate the excess water, hasten the setting of the coating to a highly water-insoluble state, and drive off HCl formed by hydrolysis.

(2) An aqueous solution of the original chlorine-containing complex is coated on the material to be treated, followed by heating to hasten hydrolysis of the complex and convert the coating to a highly water-insoluble state. The heating also drives off excess water and the HCl formed by hydrolysis.

(3) An aqueous solution of the original chlorine-containing complex is boiled to hydrolize the complex, but without sufficiently prolonged heating to set-up the complex to a water insoluble state (15 minutes to two hours boiling is suitable). The aqueous solution of the hydrolyzed complex is applied to the material to be treated, which is then dried in an oven at 60 to 100° C. or higher to drive off the water and HCl and convert the coating to a highly water-insoluble state. A neutralizing agent can be added to the solution (for instance, sodium bicarbonate or a tertiary amine) to neutralize the HCl.

(4) An anhydrous alcohol solution of the original chlorine-containing complex (e. g., a 20% solution is isopropanol) is treated with anhydrous ammonia in excess to form the ammoniated derivative of the complex. The reaction is exothermic and a white precipitate of ammonium chloride is formed. The resultant mixture can be diluted with three parts of water (causing the precipitate to dissolve) and applied to the material to be treated, followed by drying in an oven to drive off the alcohol and water and convert the coating to a highly water-insoluble state. The precipitate is preferably filtered from the aforesaid alcohol solution prior to dilution. The alcohol solution can be used directly, or diluted with further alcohol, so as to provide a non-aqueous coating solution of the ammoniated complex.

The present chromium complexes can be used generally for the surface treatment of hydrophilic materials including metals, glass and ceramic products, sand and other lithic materials, wood, cellulosic films, paper, textile fibers, yarns and fabrics.

Thus they can be used to provide corrosion-resisting water-repellent coatings on metals. Ice formed in contact with such a treated surface has a low adhesion, indicating utility for treating the aluminum surfaces of refrigerator ice-cube trays and of airplane wings, etc.

Glass articles can be treated to provide highly water-repellent coatings which are also oil-repellent, thus indicating utility for treating window panes, windshields, and lenses of electric flash lights, search lights, automobile headlights and taillights, etc.

Glass filaments and fibers can be treated to provide tough and tightly bonded surface films that protect the glass from abrasion. This is of value because glass yarns and the like have the defect that the rubbing together of the glass filaments or fibers causes scratching of the surfaces which destroys the tensile strength of the scratched filaments or fibers.

The present complexes are also useful in producing primer coatings on glass, metal, and other surfaces, which provide a better anchorage for subsequently applied fluorocarbon polymer coatings, owing to the fluorocarbon characteristic of the surface of such primer coatings.

The saturated perfluoro-monocarboxylic acid starting compounds ($R_fCOOH$) can be made by hydrolyzing the corresponding acid fluorides ($R_fCOF$), which are highly reactive and readily and quickly react with water to form the carboxylic acid derivatives. The acid fluorides can be made by electrolyzing a solution of anhydrous liquid hydrogen fluoride containing a dissolved hydrocarbon monocarboxylic acid (or its anhydride) of corresponding carbon skeletal structure, by passing direct current through the solution in a nickel-anode cell at a cell voltage of about 5 to 6 volts, which is insufficient to generate molecular (free elemental) fluorine under the existing conditions, but which is sufficient to cause the formation of the fully fluorinated acid fluoride derivative ($R_fCOF$) at a useful rate. The fluorocarbon acid fluoride product of the cell operation is relatively insoluble in the electrolyte solution and either settles to the bottom of the cell from which it can be drained with other fluorocarbon products of the process, or is volatilized and evolves from the cell in admixture with the hydrogen and other gaseous products. The electrochemical process is described in detail in the patent of J. H. Simons, No. 2,519,983 (August 22, 1950). Fluorocarbon monocarboxylic acids having four or more carbon atoms in the molecule are described and claimed in the copending application of A. H. Diesslin, E. A. Kauck and J. H. Simons, S. N. 70,154, filed January 10, 1949, since issued as Patent No. 2,567,011 on September 4, 1951.

The following examples illustrate the preparation of typical compositions of this invention.

Example 1

The reaction apparatus was a 500 ml. 3-necked flask equipped with a mechanical stirrer, water-cooled reflux condenser protected by a drying tube, and a dropping funnel. It was heated by an electrical heating mantle.

The flask was charged with 220 grams of carbon tetrachloride to which was added a solution of 6.0 grams (0.028 mols) of n-heptafluorobutyric acid, $CF_3(CF_2)_2COOH$, and 2.5 grams of absolute ethanol. After heating to a refluxing state, and with constant stirring, dropwise addition of 9.0 grams (0.058 mols) of chromyl chloride in 50 grams of carbon tetrachloride was made at such a rate that vigorous reflux was maintained. During the course of the reaction the heating mantle was replaced by a water bath since the reaction is quite exothermic. After all the chromyl chloride had been added, stirring at reflux (with external heating) was continued for an additional hour. The reaction mixture was transferred to an evaporating dish and the solvents removed in an air-circulating oven at 80° C.

The yield of green solid material, after drying to constant weight, was quantitative. Analysis showed 18.0% Cr, 22.6% F and 19.1% Cl. It was highly soluble in acetone and isopropanol and slightly but completely soluble in water.

Example 2

The apparatus and general procedure were the same as in the preceding example, but use was made of n-undecafluorocaprioic acid, $CF_3(CF_2)_4COOH$. To 8.8 grams (0.028 mols) of this acid and 2.5 grams of ethanol in 220 grams of carbon tetrachloride, refluxing in the flask, was added dropwise 9.0 grams (0.058 mols) of chromyl chloride in 25 grams of carbon tetrachloride.

The yield of green solid material, after drying to constant weight, was quantitative. Analysis showed 16.9% Cr, 22.4% F and 22.6% Cl. It was highly soluble in acetone and isopropanol and slightly but completely soluble in water.

Example 3

This example illustrates the use of a cyclic fluorocarbon acid. The apparatus and general procedure were the same as in the preceding examples. To 18.3 grams (0.056 mols) of perfluorocyclohexane carboxylic acid, $C_6F_{11}COOH$, and 2.5 grams of absolute ethanol in 220 grams of carbon tetrachloride, refluxing in the flask, was added dropwise 18.0 grams (0.116 mols) of chromyl chloride in 25 grams of carbon tetrachloride. After stirring and refluxing for two additional hours, the residual light yellow color was removed by addition of 1 gram of absolute ethanol.

The yield of green solid after removal of solvent and drying to constant weight was quantitative. Analysis showed 8.2% Cr, 29.4% F and 20.6% Cl. It was soluble in acetone and isopropanol and slightly but completely soluble in water.

I claim:

1. Chromium coordination complexes of the class consisting of: (A) complexes formed by reacting chromyl chloride with saturated perfluoromonocarboxylic acids having from 4 to 10 carbon atoms in the molecule, in an inert anhydrous solvent vehicle and in the presence of a reducing agent, and (B) the hydrolyzed and ammoniated derivatives thereof; these chromium complexes being solids which are slightly soluble in water and are highly soluble in acetone and alcohols.

2. Chromium coordination complexes formed by reacting chromyl chloride with saturated perfluoroalkyl monocarboxylic acids having from 4 to 10 carbon atoms in the molecule, in an inert anhydrous solvent vehicle and in the presence of an alcohol reducing agent; these chromium complexes being chlorine-containing green solids which are slightly soluble in water and are highly soluble in acetone and alcohols.

3. An article having a hydrophilic type surface upon which is tightly bonded a thin water-insoluble coating film formed from a complex defined in claim 1.

4. An article having a hydrophilic type surface upon which is tightly bonded a thin water-insoluble coating film formed from a complex defined in claim 2.

THOMAS S. REID.

References Cited in the file of this patent

UNITED STATES PATENTS

| Number | Name | Date |
|---|---|---|
| 2,118,772 | Terres et al. | May 24, 1938 |
| 2,273,040 | Iler | Feb. 17, 1942 |
| 2,549,220 | McLaren | Apr. 17, 1951 |